United States Patent [19]
Persson

[11] Patent Number: 4,457,526
[45] Date of Patent: Jul. 3, 1984

[54] WHEEL ASSEMBLY

[76] Inventor: Kjell O. Persson, P1 2127, S-280 10 Sösdala, Sweden

[21] Appl. No.: 387,875

[22] PCT Filed: Oct. 9, 1981

[86] PCT No.: PCT/SE81/00293
§ 371 Date: Jun. 8, 1982
§ 102(e) Date: Jun. 8, 1982

[87] PCT Pub. No.: WO82/01356
PCT Pub. Date: Apr. 29, 1982

[30] Foreign Application Priority Data
Oct. 10, 1980 [SE] Sweden .............................. 8007101

[51] Int. Cl.³ ............................................. B62B 5/02
[52] U.S. Cl. ...................................... 280/5.26; 305/1
[58] Field of Search ............. 280/5.26; 180/8 A, 8 B, 180/8 R; 305/1

[56] References Cited
U.S. PATENT DOCUMENTS 1,887,427  4/1932  Porcello ........................... 280/5.26
2,363,636  2/1942  Bloch et al. ......................... 280/29
3,283,839  11/1966  Brown et al. ..................... 280/5.26

FOREIGN PATENT DOCUMENTS
2124284  11/1972  Fed. Rep. of Germany .

*Primary Examiner*—John A. Pekar
*Attorney, Agent, or Firm*—Fleit, Jacobson, Cohn & Price

[57] ABSTRACT

A wheel assembly for driven or non-driven trolleys or the like, comprising at least one set of wheels (10, 11) having at least three wheels (11) which are mounted on the trolley by a bearing means (13). The bearing means (13) has a center of rotation (C) which is located on the axial center line of the set of wheels (10, 11) and is connected to the trolley, at a distance from this center of rotation (C). When the wheels (11) encounter an abstacle as the trolley is run, the bearing means (13) will rotate relative to the set of wheels (10, 11), which causes shifting of the center of gravity so as to permit the set of wheels to climb over the abstract without the need of any appreciable additional effort.

3 Claims, 4 Drawing Figures

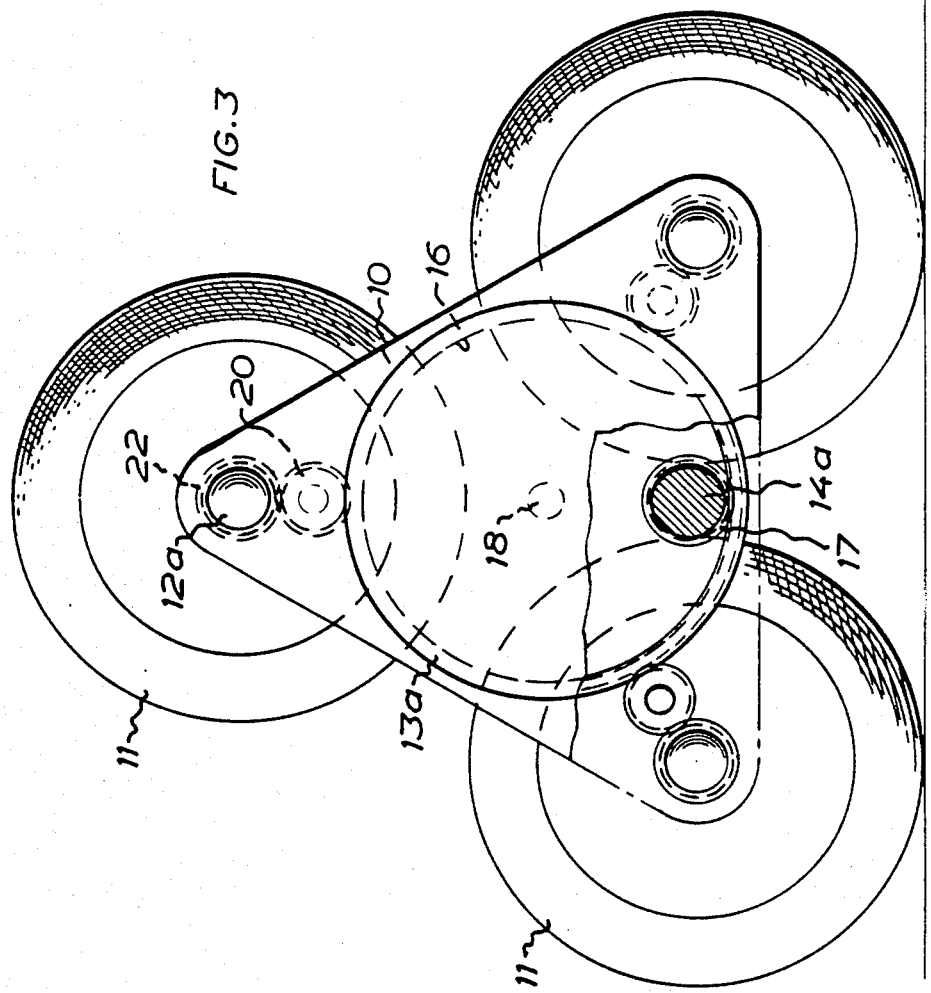

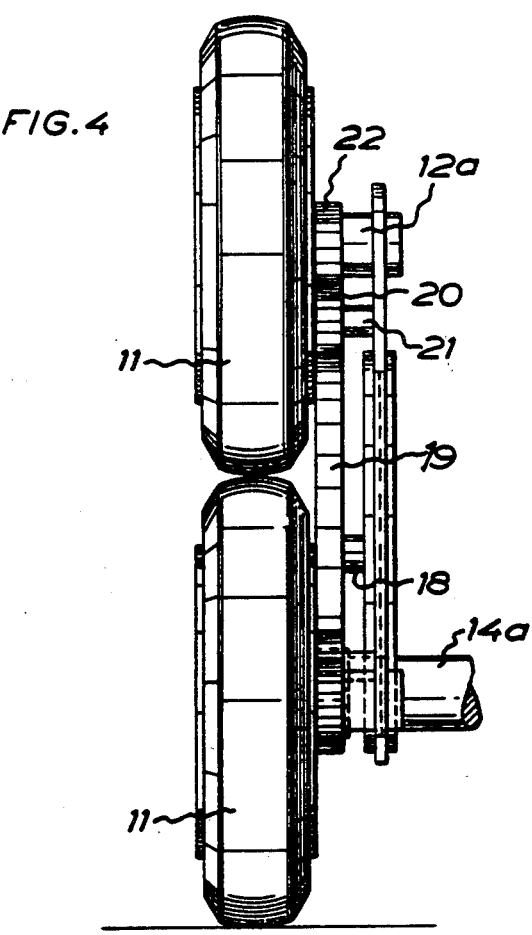

WHEEL ASSEMBLY

The present invention relates to a wheel assembly having a frame and at least one set of wheels supporting said frame and including at least three wheels which are mounted on a holder equidistantly around the periphery thereof.

It is a well-known fact that it is difficult and often impossible to pull or push a loaded wheeled carriage, for instance a wheelbarrow, sack trolley, pram etc., on an uneven base, such as stony ground, steps etc. Unsuccessful attempts have been made to solve this problem, for instance by means of star-shaped wheels which in each point of the star have rotatably mounted wheels. The same problem is encountered in driven carriages, in particular cross-country vehicles in which attempts have been made to improve the performance by increasing the wheel size.

The object of the present invention is to solve the above defined problem and provide a wheel assembly which permits, for instance, pulling a heavily loaded sack trolley provided with such a wheel assembly over a curb stone, up a staircase etc. This object is achieved in that the holder is rotatably mounted around the periphery of a circular bearing means whose centre axis coincides with the axis of rotation of the holder, and in that the frame is connected to the circular bearing means at a radial distance from said centre axis.

When during running of the trolley the wheels of such a wheel assembly encounter such an obstacle that the rolling movement of the wheel is arrested, the point of connection between the trolley and the bearing means will start rotating relative to the centre of the bearing means, which causes shifting of the centre of gravity, whereby the topmost wheel will be tilted downward towards the obstacle to bear on the upper side thereof, whereupon the continued movement of the trolley will take place with the last-mentioned wheel rolling on the base.

The invention will be described in greater detail hereinbelow with reference to the accompanying drawings showing various embodiments.

FIG. 1 in side elevation shows a simple application of the invention.

FIG. 3 shows a wheel assembly with driven wheels, and

FIG. 4 is an end view of the wheel assembly in FIG. 3.

Figure 1:
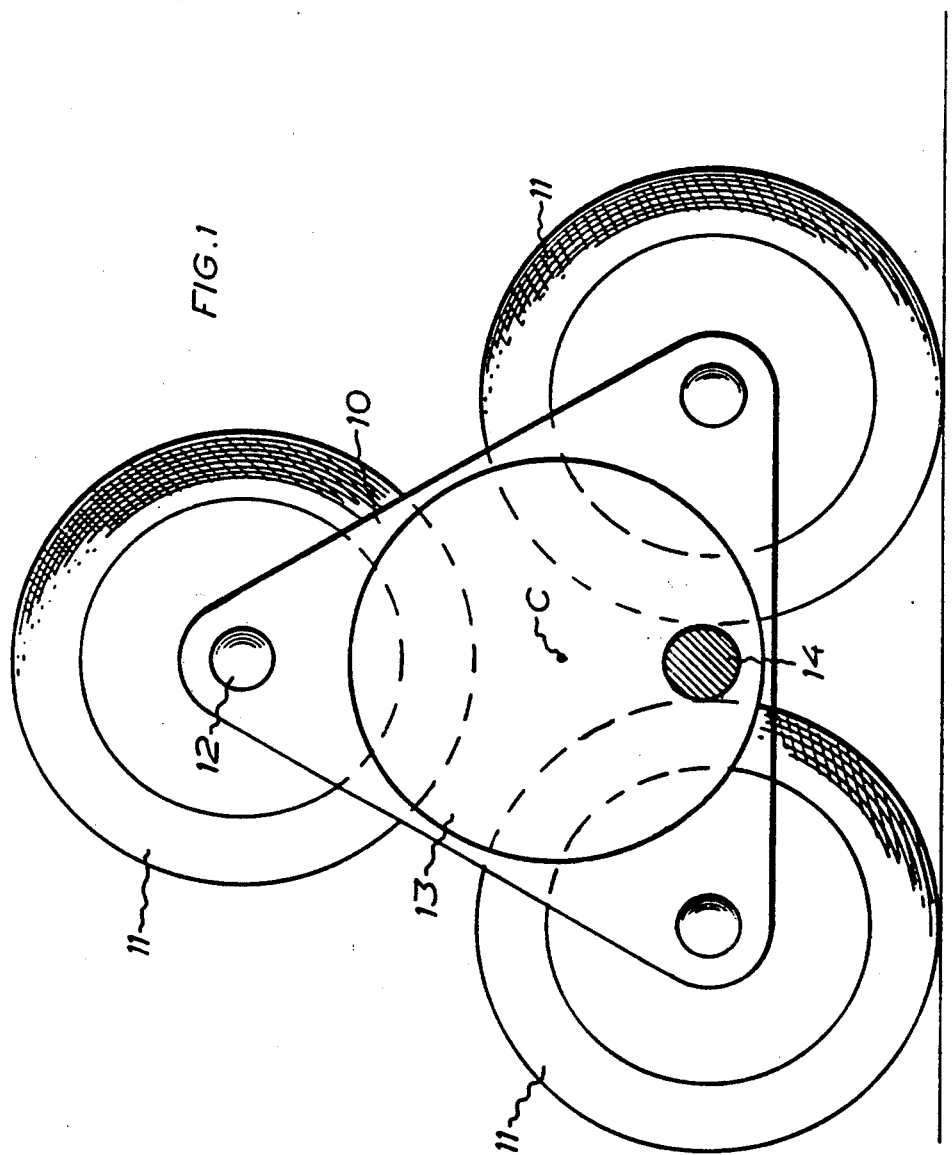

The wheel assembly shown in FIG. 1 consists of a holder 10 in the form of an equilateral triangle. Adjacent the points of the holder 10, wheels 11 of equal size are mounted by means of journals 12. The holder 10 has a circular central opening in which a bearing means 13 in the form of a planar disc is mounted, for instance by means of flanges on the opposite sides of the disc which are of a diameter greater than that of the opening of the holder. If so desired, the bearing means 13 can be provided with friction-reducing means, for instance in the form of ball bearings, around its peripheral surface facing the wall of the opening of the holder. As seen in FIG. 1, the wheel assembly consisting of the holder 10 and the wheels 11 has an axial centre line on which the centre C of the bearing means 13 is situated. An axle 14 is fixedly connected to the bearing means 13 at a location spaced from the centre C of the bearing means.

Figure 2:
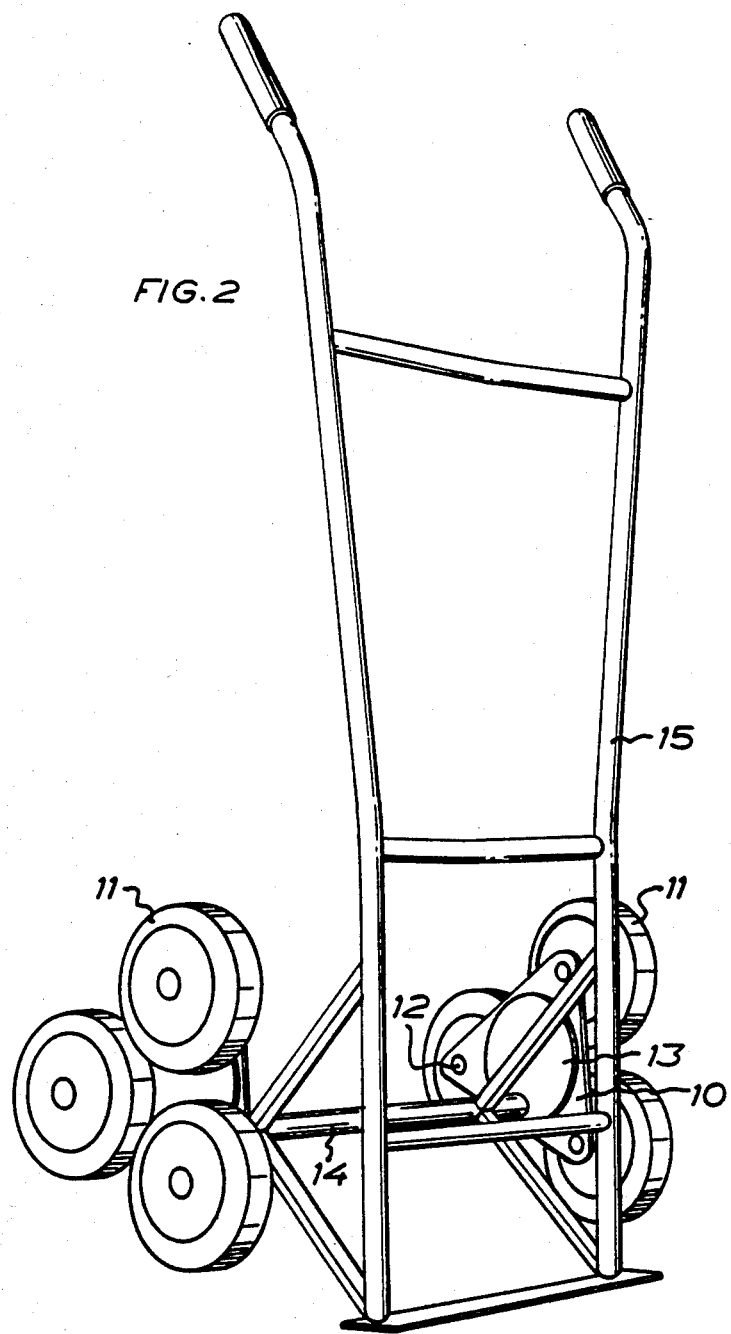
FIG. 2 shows a sack trolley provided with a wheel assembly of the type shown in FIG. 1.

As appears from FIG. 2, two wheel assemblies of the type shown in FIG. 1 can be mounted on a sack trolley by means of the axle 14. When the trolley is run and encounters for instance a curb, one wheel 11 of each assembly will strike the curb stone and the rolling movement will be stopped. Continued force exertion on the sack trolley will then cause the bearing means 13 to rotate as a result of the connection of the axle 14 with the bearing means at a distance from the centre C thereof. Thus, if a force is exerted to the left in FIG. 1, the means 13 will rotate clock-wise, resulting in a shifting of the line of force so as to increase the leverage, such that when the axle has rotated clock-wise slightly more than a quarter of a revolution, the holder 10 will start tilting to the left, whereby the topmost wheel 11 in FIG. 1 is pivoted downwards on to the top of the curb stone. When this wheel 11 has reached the surface of the curb and starts rolling thereon, the left-hand wheel in FIG. 1 will easily roll up on top of the curb and the continued movement of the trolley will take place with these two wheels rolling on the base. The right-hand wheel 11 in FIG. 1 will then be located above the other two wheels 11. It is evident that if, when running the trolley shown in FIG. 2, one encounters an obstacle which affects only one wheel assembly, this will mount the obstacle, while the other wheel assembly will continue its rectilinear movement.

Many modifications of the wheel assembly shown in FIGS. 1 and 2 are of course possible. Thus, the three wheels 11 illustrated can be replaced by a single wheel, whose centre of rotation will then of course coincide with point C. Similarly, more than three wheels 11 can be provided. In FIG. 1, the three wheels are mounted in the same plane but in a particularly suitable embodiment they are mounted in different planes, so that their peripheries will overlap as seen in the axial direction. By this embodiment, it will be possible to obtain a still gentler climbing on the obstacle than in the embodiment shown in FIG. 1. The bearing means 13 need of course not be circular but may instead be in the form of an arm which is mounted in point C and, spaced therefrom, carries the axle 14 or the like. The embodiment according to FIG. 1 including three or more wheels is well suited for instance for sack trolleys or prams, while the embodiment including a single wheel is advantageous for instance in wheelbarrows.

The invention has been described above with reference to non-driven trolleys but is also usable for driven trolleys, as will appear from FIGS. 3 and 4. In the embodiment shown in FIG. 3, the holder 10 supporting the wheels 11 is provided with a bearing means 13a which can be mounted in the holder 10 in the same way as the means in FIG. 1 but which has an inner gear rim 16 integral therewith. The axle 14a is axially non-displaceably but rotatably mounted in the means 13a and carries a gear rim 17 which meshes with the inner gear rim 16 of the means 13a. Thus, on rotation of the axle 14a, the bearing means 13a will be rotated. In the centre of the means 13a, there is fixed a journal 18 which carries a gear wheel 19 (FIG. 4) which in turn meshes with intermediate gear wheels 20 which are rotatably mounted on the holder 10 by means of journals 21. The gear wheels 20 in turn mesh with gear wheels 22 which are fixedly connected to the journals 12a non-rotatably connected to the wheels 11 and mounted in the holder 10. As appears from FIGS. 3 and 4, the axle 14a when being rotated will drive the gear wheels 22 of the wheels by the gear train 17, 16, 20. When one of the wheels 11 of the wheel assembly according to FIGS. 3 and 4 encounters an obstacle, the same climbing as described above with reference to the foregoing embodiment will take place.

The invention provides an extremely simple wheel assembly which moves over all kinds of obstacles with facility. The size of the wheels 11 is of course selected according to the sizes of the obstacles to be expected when running the trolley on which the wheel assembly is to be mounted. By way of example, it may be mentioned that a person can quite easily pull the sack trolley of FIG. 2 loaded with 100 kg up a staircase, which would not have been possible with a sack trolley of conventional design.

I claim:

1. A wheel assembly comprising:
   a holder;
   a least three wheels rotatably mounted on the holder equidistantly around the periphery thereof;
   a circular bearing means rotatably carried by the holder and having its center axis coincident with the axis of rotation of the holder; and
   a frame connected to the circular bearing means at a radial distance from the center of the bearing means.

2. Wheel assembly as claimed in claim 1, wherein the bearing means is connected to the frame by means of a driven member rotatably mounted in said bearing means, said driven member carrying a first gear wheel, a second gear wheel carried on the bearing means and in meshing engagement with the first gear wheel, and a gear train driven by the second gear to drive each of the wheels of said set of wheels.

3. Wheel assembly as claimed in claim 2, wherein the bearing means has an inner gear and the gear train includes a central gear wheel coaxially fixed on the bearing means, a plurality of intermediate gear wheels meshing with said central gear wheel, and a gear wheel connected to each wheel of said set of wheels and meshing with one of said intermediate gear wheels.

* * * * *